W. H. GRUENHAGEN.
EGG CARRIER.
APPLICATION FILED FEB. 20, 1915.
1,207,027.
Patented Dec. 5, 1916.
3 SHEETS—SHEET 1.
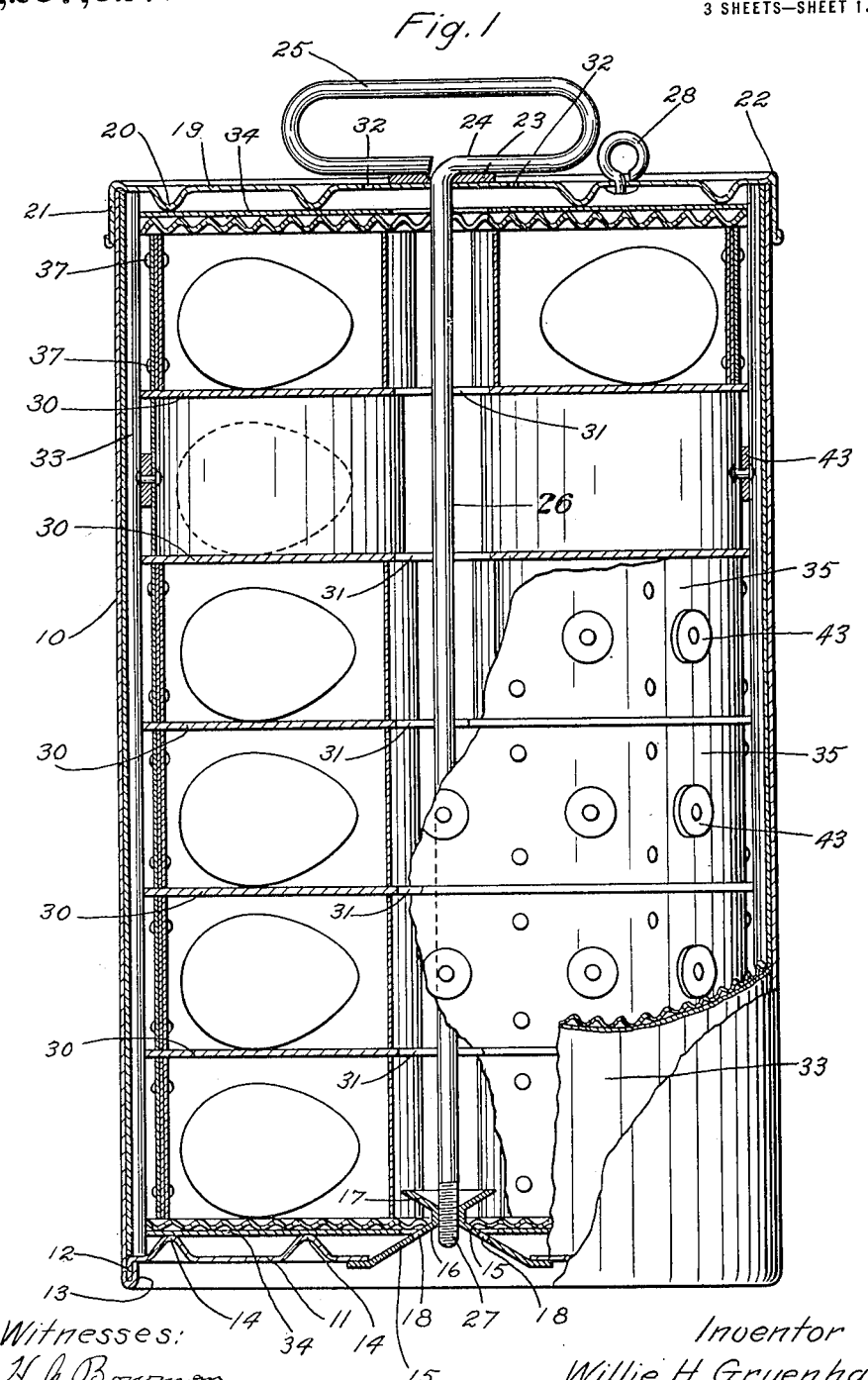
Witnesses:
H. A. Bowman
Alex. Lagaard
Inventor
Willie H. Gruenhagen
By his Attorney

W. H. GRUENHAGEN.
EGG CARRIER.
APPLICATION FILED FEB. 20, 1915.

1,207,027.

Patented Dec. 5, 1916.
3 SHEETS—SHEET 2.

Witnesses:
Alex. Lagaard
H. G. Bowman

Inventor
Willie H. Gruenhagen
By F. G. Whiteley
his Attorney

W. H. GRUENHAGEN.
EGG CARRIER.
APPLICATION FILED FEB. 20, 1915.

1,207,027.

Patented Dec. 5, 1916.
3 SHEETS—SHEET 3.

Witnesses:
Alex. Lagaard
A. M. Royal

Inventor
Willie H. Gruenhagen
By F. A. Whiteley
his Attorney

UNITED STATES PATENT OFFICE.

WILLIE H. GRUENHAGEN, OF ST. PAUL, MINNESOTA.

EGG-CARRIER.

1,207,027.　　　　Specification of Letters Patent.　　Patented Dec. 5, 1916.

Application filed February 20, 1915. Serial No. 9,558.

*To all whom it may concern:*

Be it known that I, WILLIE H. GRUENHAGEN, a citizen of the United States, residing at St. Paul, in the county of Ramsey and State of Minnesota, have invented certain new and useful Improvements in Egg-Carriers, of which the following is a specification.

My invention relates to egg carriers and has for its object to provide a carrier for eggs which will be capable of receiving and supporting in individual compartments a large number of said eggs so held that the carrier may be shipped by parcels post or express over long distances and the eggs will be kept from breaking and be conveyed in good condition to their destination.

It is a further object of my invention to provide such a carrier which shall be relatively light, shall be constructed entirely or principally of metal and therefore be capable of ready cleansing and sterilization through the use of hot water or steam, and which shall be convenient and easy to handle and operate by the post-office or express companies.

The full objects and advantages of my invention will appear in connection with the detailed description thereof and are particularly pointed out in the claims.

Figure 4:
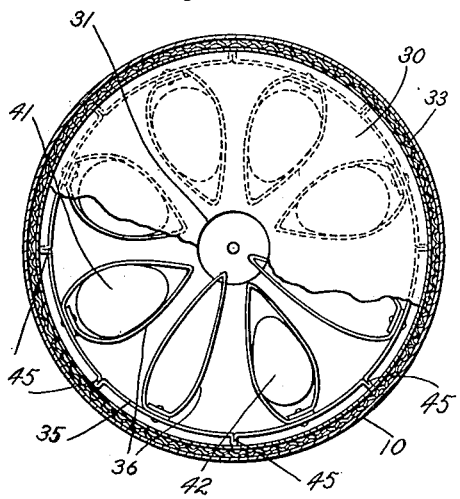
Figure 2:
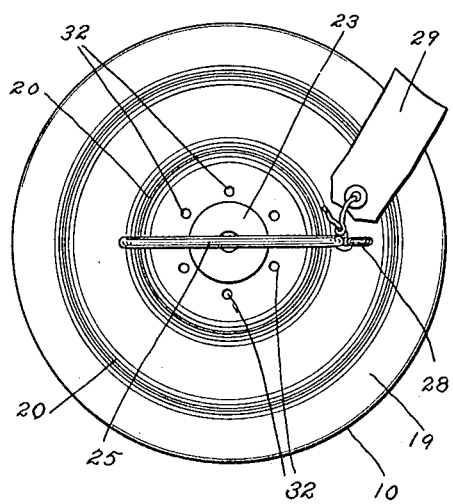
Figure 3:
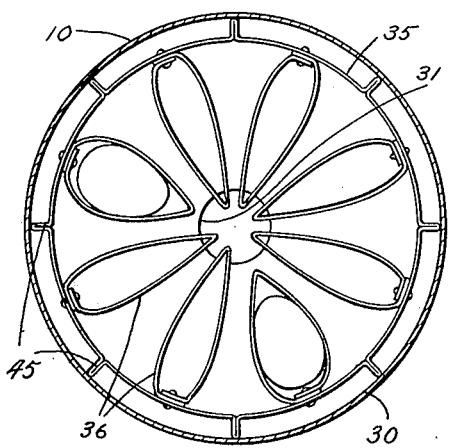
Figure 8:
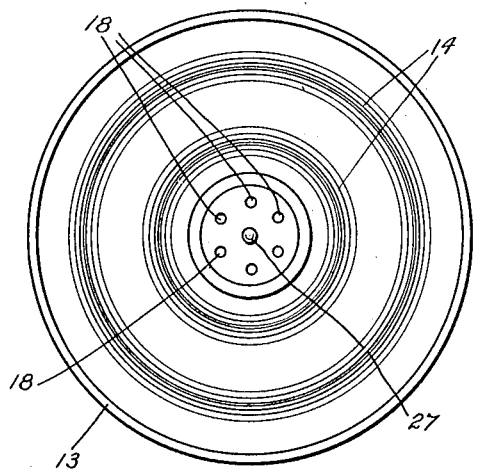
Figure 6:
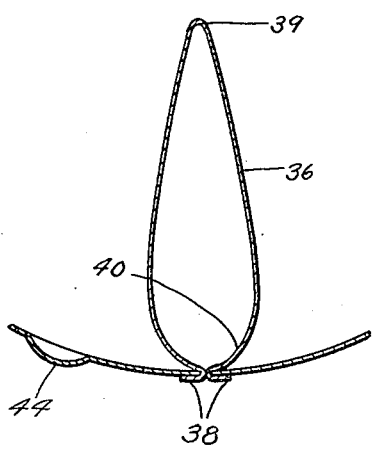
Figure 5:
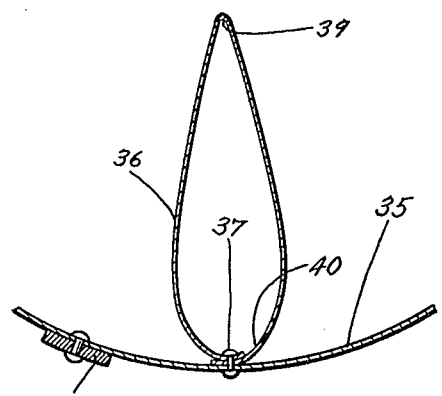
Figure 7:
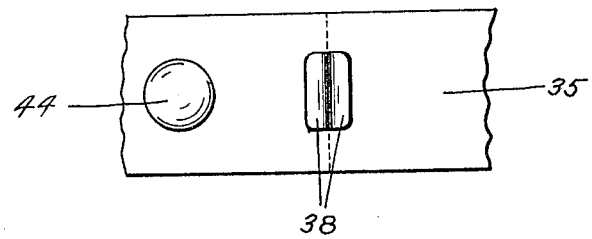

In the drawings, illustrating the application of my invention in one form, Figure 1 is an elevation view partly in section and with some parts broken showing an egg case including my improvements. Fig. 2 is a top plan view of the egg case. Fig. 3 is a sectional view of the case shown in Fig. 1. Fig. 4 is a sectional view of a modification. Figs. 5 and 6 are detail sectional views showing the manner of securing the egg compartments to the cylindrical ring. Fig. 7 is a side view of the parts shown in Fig. 6. Fig. 8 is a bottom view of the egg case.

The outer portion of the egg container or egg case consists of a cylindrical can 10, preferably formed of sheet metal, which should be sufficiently strong to resist the ordinary shocks incident to handling, but which, owing to the shape and the character of top and bottom employed therewith, and in view of the internal support given by the spacer members hereinafter described, may be sufficiently light so that the aggregate weight of the carrier will be reduced to a desirable minimum for the purpose of mail and other transportation. The bottom member 11 is formed with a downwardly-turned peripheral flange 12 which is clamped by a recurved portion 13 of the cylinder wall 10. It will thus be seen that by this means a ring is formed of three thicknesses of metal which provides a circular bottom portion upon which the receptacle rests and which engages the floor or other solid substance and resists shock and distortion of the carrier. As further shown in Figs. 1 and 8, the bottom 11 is provided with a series of inwardly-turned corrugations 14, for a purpose later to be noted, and a central conical depression 15. The conical depression 15 is provided at its apex with a threaded nut 16 from the top of which, inside of the container, is a flaring conical extension 17. Perforations 18 in the conical member 15 permit air to enter the same.

The cover 19 is provided with a series of depressed flanges 20 and an outside flange 21 turned up at its edge 22 for the purpose of reinforcing the cover. A washer 23 is secured to or may be loose upon the central portion of cover 19 and is adapted to be engaged by the lower portion 24 of a handle 25 secured to a spindle 26 which extends through apertures in the washer 23 and cover 19 and has a lower threaded end 27 which screws into the threaded nut 16. The threaded end 27 is guided to the opening in nut 23 by the flaring extension 17. When the rod is screwed down so as to bring the handle portion 24 firmly upon washer 23, the cover is securely sealed upon the container. An eyelet 28 is secured to the cover 19 and in shipping the container with its contents the shipping tag 29 will be tied, sealed or otherwise secured to the handle 25 and eyelet 28, thereby preventing the rod 26 from unscrewing. It will be apparent that the handle 25 not only provides a convenient device for screwing up the rod 26 and securing the cover upon the receptacle, but also forms a hand-hold for most effectively lifting and carrying the egg container. This is of great importance, for in shipment, particularly by parcels post, the container must be handled a great many times, and where it is practicable to do this conveniently by the use of one hand, as is the case with my invention, there will be little likelihood that the container will be dropped or thrown, as so frequently happens with containers in use which are not provided with any means adapting them to be conveniently lifted and carried by the use of one hand.

For supporting the eggs within the container I provide a series of spacer disks 30, each circular and each provided with a central circular aperture 31. The several apertures 31 come above one another, and in conjunction with the apertures 18 at the bottom and with apertures 32 in the cover 19 provide means of circulation through the container. As shown in Fig. 3, the spacer members 30 are of substantially the same diameter as the inner diameter of the cylinder 10 and when in position engage the inner wall of said cylinder, and directly reinforce the same from distortion by reason of an impact on the outside of cylinder 10. As shown in Figs. 1 and 4, the spacer members 30 are of smaller diameter than the interior of the case 10 and are surrounded by a cylindrical lining 33 of packing material, such as corrugated board. Also, the top and bottom spacer members may be, as shown at 34, in Fig. 1, of the same material. Where it is desired to peculiarly safeguard the contents of the container the inner packing cylinder 33 may be employed, but as is later pointed out, in reference to the showing of Fig. 3, such an employment of packing material is not at all essential.

Resting upon the spacer members 30, and holding said members in their proper position within the container, are the egg holders. These comprise cylindrical bands 35 of a width slightly greater than the minor diameter or axis of an egg. To the bands 35 are secured a plurality of loop devices 36. The bands 35 and the loop devices 36, as well as the spacers 30, may be of any suitable material, such as flexible paper board or sheet metal. In case flexible paper board is employed the loop devices may be secured to the bands 35 by rivets, as indicated at 37 in Fig. 5. Where metal is employed the securing of the loops 36 to bands 35 may cheaply and satisfactorily be effected by carrying tongues 38 of the loops 36 through slots in the bands 35 and turning the tongues over, as clearly shown in Figs. 6 and 7. Because of the fact that the use of all metal members readily permits sterilization of the case after use by the application of hot water or steam, the use of metal for all parts of the case is preferable, and it is a matter of importance in my invention that the construction thereof permits the production of a case of all metal which is so light as to be practicable for use in the mails.

The arrangement of the loop devices 36 upon the bands 35, and the form of these loop devices in reference to this arrangement, is an important feature of my invention. As clearly shown, the loop devices are normally of a flattened egg shape having a relatively acute point 39 and more broadly rounded base 40. As shown, these devices, whether of metal or flexible paper board, occupy a normal position with the walls closer together than the normal diameter of an egg and the points extending radially but out of contact with each other. As indicated in Fig. 4, eggs 41 and 42, of different sizes and relative shape, when inserted in the loop members will have the walls of said members in engagement with the walls of the egg. The egg is then held from any movement independent of the loop members, although the loop members are capable of oscillatory movement by reason of the yielding of the material of said members at their point of attachment with the bands 35. Furthermore, if the container is engaged upon its side walls so as to force the bands inwardly at any point, this will have the effect of moving the loops 36 in a general radial direction. Under the influence of this or any other movement of the loops they would be incapable of moving to an extent sufficient to contact with an adjacent loop. The eggs are therefore each individually held by the walls on both sides of the egg so that they cannot have any movement independent of the holding means and cannot contact under movement either with other eggs or with any part of the container.

In order that a shock or blow from the side of the outer container 10 shall not be communicated to a band 35 at a point on the band where one of the egg-holding loops 36 is connected thereto, I provide offset devices between said points of attachment, which offset devices are in engagement either with the interior walls of cylinder 10, or with the inner portions of lining member 33. As shown in Figs. 1 and 5, these spacer members comprise disks 43 of leather, pasteboard or other suitable material secured to the bands 35 by rivets at points midway between the points 37, where the loop members are secured to bands 35. As shown in Figs. 6 and 7, the offset devices consist of portions 44 pressed outwardly from the body of the material of which band 35 is composed. As shown in Figs. 3 and 4, the offset devices are formed by crimping the band 35 outwardly at stated intervals to form a series of longitudinal flanges 45 positioned between the points of attachment of the loop members 36. The offset devices 45 and 44 cannot be practically formed excepting with metal bands. The construction shown in Fig. 3 is very effective where it is desired to use the bands 35 and spacer members 30 without a packing lining 33. The offset flange members 45 in such case are of considerable depth, at least three-eighths of an inch being desirable, and such flanges engage the wall of the container 10 throughout their length. The spacer members 30 also engage the entire circumference of the inner wall of member 10. The portion of the wall 10, therefore, opposite any point of attachment of a loop member 36 with a band 35 is held spaced from said points of attachment by a surrounding set of guard devices comprising the flanges 45 and the spacer members 36. If a blow were given the wall 10 at one of these points, it might dent the wall, but such denting could not carry to the band at the point where the egg-holding loop 36 was connected thereto, and therefore the egg would be protected from shock. In case the blow were struck at a point opposite the point of engagement of a flange 45 with wall 10, such blow would be communicated to the band 35, but at a point between the points of attachment of the loops 36. If the blow were severe enough to distort the band, it would still have no effect upon the eggs within the loops, merely moving the loops with the band in a generally radially-inward direction.

The simplicity, efficiency and generally desirable features of my egg container will thus be apparent. In the size shown, wherein each band contains eight loops adapted to carry eight eggs, and there are six of such bands, it will be apparent that four dozen eggs can be carried. Such a container, even when constructed entirely of metal, will weigh only a few pounds and will constitute a comparatively compact package that can be handled with ease, can be set anywhere, cannot be damaged by rain or moisture of any sort, can be completely sterilized after each use and therefore is thoroughly sanitary, and will convey its egg contents securely even over long distances. Furthermore, the egg-containing elements are readily assembled in and withdrawn from the outer casing, so that the same may be packed and unpacked with the utmost ease. After unpacking the container, and reassembling the parts thereof, it is in perfect condition for return shipment, the return address of the farmer or producer using the containers being preferably stamped or printed on the container.

I claim:

1. An egg carrier comprising a cylindrical case having a fixed bottom and a removable cover, spacer disks within the case, bands upon the spacer disks and separated egg-holding loops each secured to the bands, and means for securing the cover upon the casing.

2. An egg carrier comprising a cylindrical case having a fixed bottom and a removable cover, spacer disks within the case, cylindrical bands upon the spacer disks, a plurality of separated egg-holding loops each secured to the bands at a single point of said loops, and means for securing the cover upon the casing.

3. An egg carrier comprising a cylindrical case having a fixed bottom and a removable cover, spacer disks within the case, cylindrical bands upon the spacer disks, a plurality of egg-holding loops each secured to the bands at a single point of said loops, said loops being of flattened egg shape with the most pointed portion at the center and all of said loops extending radially toward the center, and means for securing the cover upon the casing.

4. An egg carrier comprising a cylindrical case having a fixed bottom and a removable cover, spacer disks within the case, circular bands of less diameter than the case resting loosely upon the spacer disks, a plurality of egg-holding loops secured to the bands, and extension members on the outside of the bands for engagement with the inner wall of the case to hold the bands and egg-holding loops positioned and to receive any shock taking place on the outside of the case.

5. An egg carrier comprising a cylindrical case having a fixed bottom and a removable cover, spacer disks within the case, circular bands of less diameter than the case resting loosely upon the spacer disks, a plurality of egg-holding loops secured to the bands, and extension members on the outside of the bands for engagement with the inner wall of the case to hold the bands and egg-holding loops positioned and to receive any shock taking place on the outside of the case, said extension members being positioned on the bands at points midway between the points of attachment of adjacent pairs of egg-holding loops.

6. An egg carrier comprising a cylindrical case, spacer disks within the case, bands upon the spacer disks, and egg-holding loops secured to the bands and adapted to move independently relative to each other in any direction in the plane of the spacer disks.

7. An egg carrier comprising a cylindrical case, circular spacer disks, cylindrical bands upon the spacer disks formed of sheet metal and having a plurality of ribs extending outwardly from the periphery of the band, and egg-holding loops secured to the bands between each pair of ribs.

8. An egg carrier comprising a cylindrical case, spacer disks within the case, circular bands resting loosely upon the spacer disks, a plurality of radially extended egg holding loops of flattened egg shape each secured to
5 the band at a single point at the center of the large end of the loop, said band being of such diameter relative to the length of the loops that a space is provided within the inner limits of the loops into which said loops may be projected when the casing is struck 10 and the bands are caused to yield.

In testimony whereof I affix my signature in presence of two witnesses.

WILLIE H. GRUENHAGEN.

Witnesses:
F. A. WHITELEY,
H. A. BOWMAN.

Copies of this patent may be obtained for five cents each, by addressing the "Commissioner of Patents, Washington, D. C."